Patented June 6, 1933

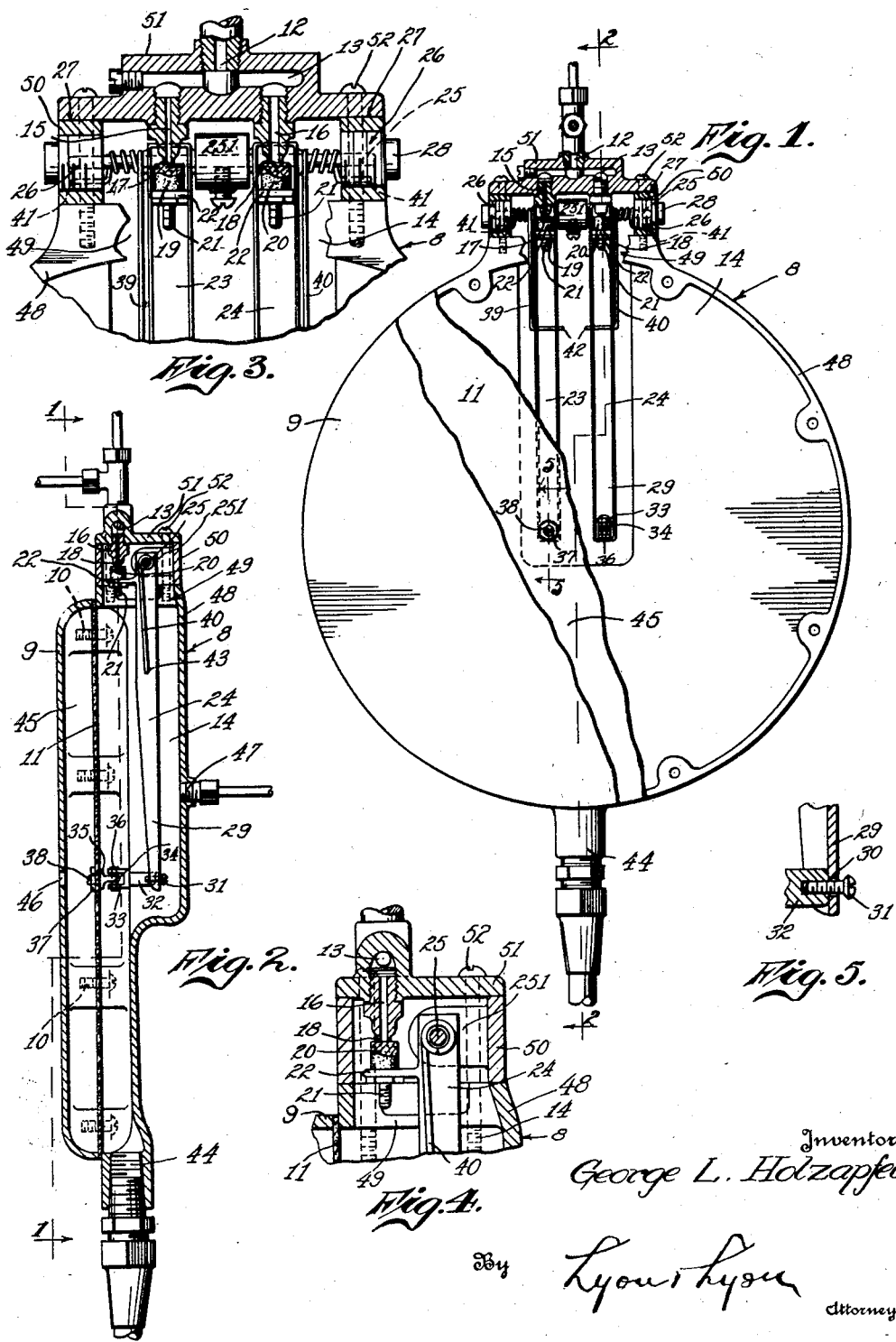

1,912,479

UNITED STATES PATENT OFFICE

GEORGE L. HOLZAPFEL, OF PALOS VERDES ESTATES, CALIFORNIA, ASSIGNOR TO RICHFIELD OIL COMPANY OF CALIFORNIA, OF LOS ANGELES, CALIFORNIA, A CORPORATION OF CALIFORNIA

PRESSURE REDUCING VALVE

Application filed October 27, 1930. Serial No. 491,468.

This invention relates to pressure reducing valves, and an object is the general improvement of this type of valve.

Another important object is to provide a valve construction of this type that is especially serviceable when it becomes necessary to reduce the pressure of gas from a very high pressure to a very low pressure, the low pressure being, for example, atmospheric or a little above or a little below atmospheric; and, furthermore, is serviceable where the storage or pressure supply varies greatly, for example, from say, 50 lbs. per square inch to 200 lbs. per square inch. Under the conditions noted above, the existing types of pressure reducing valves are not satisfactory.

The reason that the present types of pressure valves are inadequate under the conditions noted above may be explained as follows:

Assuming that the area of the high pressure gas inlet is ¼ inch in diameter (.05 square inches), the variation in pressure of gases between 50 lbs. per square inch and 200 lbs. per square inch, a difference of 150 lbs. per square inch, will cause a variation of 150÷20, or 7½ lbs. pressure on the valve seat of the gas inlet. Now, if it be assumed that the diaphragm of the pressure reducing valve is 8 inches in diameter, or approximately 50 square inches in area, and that there is no compounding of leverage between the diaphragm and valve, the variation in pressure on said diaphragm necessary to close the valve onto its seat, will be 7½÷50, or .15 lb. per square inch, which is equivalent to over four inches of water. From this it will readily be seen that, if the pressure of supply varies within the limits stated, constant adjustment would be necessary to maintain the secondary pressure at the desired value, as, for example, at a pressure equivalent to 1/10 to 1/50 of an inch of water.

When a gaseous fuel is to be mixed with air to produce a combustible mixture for driving an automobile motor, I have found that it is desirable, in order to procure the best results, that the gas carried under pressure on the automobile be reduced to substantially atmospheric pressure before mixing the gas with air and, consequently, any appreciable variation in pressure of the gas whose pressure is reduced is out of the question. I have discovered that, in practice, there must be no greater variation in the secondary pressure than 1/10 inch of water, if the most satisfactory operation of the motor at idling and slow speeds is to be achieved.

I have accomplished my purpose, in this instance, by providing a plurality of gas inlet orifices of different diameters, one so small that the suction of the motor, acting on the diaphragm, at starting will produce a greater force than the pressure differential at the valve seat produced by the primary pressure gas or, rather, pressure of the spring that holds the valve closed against the primary pressure. For example, a diameter of 1/32 of an inch may be assumed for the orifice to be used for starting and slow engine speeds. This diameter corresponds to approximately an area of 1/800 square inches. Consequently, the difference in pressure at the valve seat of this orifice, due to a maximum variation of 150 lbs. per square inch, will be less than .2 lbs. and, since the diaphragm, as mentioned above, has an area of approximately 50 square inches, pressure to be overcome by the diaphragm would be only slightly in excess of .004 lbs. per square inch or about 1/10 inch of water, providing there is no compounding of leverage between the diaphragm and the valve. If the leverage ratio between the diaphragm and valve be as 5 to 1, the pressure to be overcome would be slightly in excess of 1/50 of an inch of water.

When the motor, being supplied with the gas, is operating at the maximum speed obtainable with the gas supplied through the 1/32 inch orifice, the pressure will be lowered sufficiently to open a valve controlling another gas supply orifice which may be, for example, 1/16 inch in diameter and, thus, any desired number of gas orifices of different diameters may be opened successively as the suction increases.

To prevent leakage of gas past the valves that control the orifices, each valve is held on its seat by a spring of just sufficient strength to overcome the primary pressure of the gas so as to allow the valve to open as soon as the partial vacuum produced by the motor exceeds a predetermined value.

Other objects and advantages will appear in the subjoined detailed description.

The accompanying drawing illustrates the invention.

Figure 1 is an end view of a pressure reducing valve constructed in accordance with the provisions of this invention, portions of the cover and diaphragm being broken away and portions being shown in section on a plane indicated by the line 1—1, Fig. 2.

Figure 2 is a view, mainly in section, on the line indicated by 2—2, Fig. 1.

Figure 3 is an enlarged sectional view of the upper portion of Fig. 1, the plane of section being the same.

Figure 4 is an enlarged sectional view of the upper portion of Fig. 2, the plane of section being the same.

Figure 5 is a sectional detail on the line indicated by 5—5, Fig. 1.

There is provided a suitable case comprising a main section 8, and a cover 9 which is secured to the section 8 by screws 10. The screws 10 also pass through a diaphragm 11 which is clamped between the margins of the section 8 and cover 9.

The case is provided with an inlet 12 for gas under pressure, said inlet communicating with the chamber 13 in the case 8. From the chamber 13 gas flows into a chamber 14 in the case through a series of orifices of which, in the present instance, there are two indicated, respectively, at 15, 16. The orifices are of different diameters, in this instance, the orifice 15 being the smaller. The orifices 15, 16 terminate inwardly in valve seats 17, 18 against which seat valves 19, 20, respectively. The valves 19, 20 may be of rubber or other suitable material or composition of materials. The valves have threaded stems 21 which pass through arms 22 of levers, which are indicated, in general, by the characters 23, 24, respectively.

The fulcrum of the levers 23, 24 is constituted by a pin 25 which has its middle portion supported in a lug 251 that projects inwardly from the case section 8.

The levers 23, 24 have relatively long arms 29 which extend to the central portion of the case for connection with the diaphragm.

In this instance, the connections between the lever arms 29 and the diaphragm 11 are each constructed as follows: The lever arm 29 is provided with a hole 30 through which projects a screw 31 that is secured in one end of a link 32 which has its other end bifurcated at 33 to receive an ear 34 that projects from a button 35 secured to the diaphragm 11. The ear 34 is pivoted to the link 32 by a pin 36. On the opposite face of the diaphragm 11 from that engaged by the button 35 is a washer 37 and a screw 38 extends through said washer and into the button 35 to hold said button and the diaphragm assembled. It is to be noted that the connection between the link 32 and lever 29 is a loose one so as to permit of canting of one of the links 32 relative to the lever arm 29, as will be more fully explained hereinafter.

The valves 19, 20 are normally held closed by the pressure of springs 39, 40, respectively, which act against the arms 29 of the respective levers 23, 24. These springs 39, 40 are of different strengths. That is to say, that they are made of different sizes of spring wire and/or are tensioned differently by adjustment plugs 26 in which the ends 41 of the springs 39, 40 are anchored.

The plugs 26 have a fairly tight fit in bores 27 of the case section 8, but can be turned, for changing the tension of the springs, by applying a wrench to wrench seats 28 on the outer ends of the plugs 26. Said springs are coiled around the fulcrum pin 25 and the other ends 42 of said springs pass through holes 43 in the lever arms 29. The springs 39, 40 produce pressure in a direction to throw the levers to the left in Fig. 2, thus to yieldingly hold the valves in closed positions.

The case section 8 is provided in its edge, opposite to the inlet orifices 15, 16, with a gas outlet 44 for the secondary pressure gas. The diaphragm 11 separates the chamber 14 from another chamber 45 which occupies the cover 9. That side of the diaphragm 11 that faces the chamber 45 is exposed to atmospheric pressure since external air is admitted to the chamber 45 through an opening 46 provided in the cover 9. Thus, it will be seen that, if the outlet 44 be connected to the carbureter of an internal combustion motor, the diaphragm will be exposed on both of its faces to atmospheric pressure when the motor is not operating.

Assuming, for example, that the inlet 12 is connected with a tank holding a gas or gases under pressure, and that the outlet 44 is connected with the carbureter of an automobile, the invention operates as follows:

The motor will be started into operation in a manner well understood in the art relating thereto and such operation, being at low speed, will produce a relatively low partial vacuum in the bore of the carbureter with which the inlet 44 is connected. Consequently, a reduction of pressure will also occur in the chamber 14, thus tending to cause the diaphragm 11 to flex to the right in Fig. 2.

That portion of the diaphragm that is opposed by the weaker spring 39 will flex sufficiently to open the valve 19, but the spring 40, being stronger than the spring 39, will hold the lever 24 immovable and said lever 24, in turn, will prevent flexing of that portion of the diaphragm to which the lever 24 is connected. Consequently, at least a nearly central portion of the diaphragm will be tilted at an angle, but this can occur without affecting the lever 24 because of the particular construction of the connection between said lever 24 and the diaphragm, as hereinbefore described.

If the throttle of the motor be opened further, the further reduction of pressure produced thereby in the chamber 14 will flex the diaphragm 11 to the right in Fig. 2 against the pressure of the spring 40, thereby actuating the lever 24 so as to open the valve 20.

It will now be seen from the foregoing that among the advantages secured by the invention are the following:

1. The gas pressure is entirely shut off until a pressure of as low as 1/100 to 1/10 inch of water occurs in the chamber 14 of the case, whereupon one of the valves will open to supply gas for idling of the motor 2. As soon as the throttle is opened to any appreciable degree, the pressure in the chamber 14 decreases to an extent that causes the other valve to open, permitting passage through the engine of a greater volume of gas than it would be possible to supply through the orifice controlled by the first-mentioned valve.

If desired, the seats 17, 18 may be made detachable from the case, as clearly shown in the drawing, so that said seats can be withdrawn without otherwise dismantling the assembly.

The invention is useful, for example, as a portion of the system disclosed in copending application, filed November 8th, 1930, Serial No. 494,328 in the names of D. E. Day and G. L. Holzapfel. When thus employed the outlet 44 supplies gas to the nozzle orifice or orifices and, since the air speed in the bore of the carburetor may be so low, when the engine is being started or is idling, that gas is not quickly drawn from the nozzle orifices, it is desirable to supply the carburetor, above the throttle valve, with a small volume of gas drawn through a comparatively small tube from the chamber 14 and, accordingly, a secondary outlet 47 is shown in the case section 8 for this purpose, but it is to be understood that said secondary outlet may be omitted if it is not wanted.

The case section or body 8 is preferably constructed so as to facilitate removal of the seats 17, 18 without disturbing the valve operating mechanism and so as to facilitate removal of the entire valve operating mechanism exclusive of the diaphragm, without disturbing the diaphragm and, accordingly, the case section or body 8 is formed of a main part 48 provided with an opening 49, a hollow member 50 which carries the lug 251 and the plugs 26, and a member 51 in which is the chamber 13 and into which is screwed the valve seats 17, 18. The members 50, 51 are held assembled with the part 48 by screws 52 which pass through both members 50, 51 and into the part 48.

When the valve seats 17, 18 are to be removed for inspection or renewal, the screws 52 will be removed and the member 51 lifted off of the member 50. When it is desired to remove all of the working parts but the diaphragm, the screws 31 will be removed from the links 32, screws 52 will be removed and then both members 50, 51 lifted off, thus taking with them the valve seats, valves, and levers 23, 24.

I claim:

1. A pressure reducing valve comprising a case, a diaphragm in the case exposed on one side to atmospheric pressure, the case being provided on the other side of the diaphragm with inlet orifices of different diameters and an outlet, valve means for controlling each of the inlet orifices, and means operably connecting the valve means with different portions of the diaphragm, said connecting means being constructed to permit of flexure of said portions independently of each other.

2. A pressure reducing valve comprising a case, a diaphragm in the case exposed on one side to atmospheric pressure, the case being provided on the other side of the diaphragm with inlet orifices of different diameters and an outlet, levers pivotally mounted in the case, valves controlling the orifices and operably connected with the levers, means operably connecting the levers with different portions of the diaphragm, springs urging the levers in a direction to close the valves, the spring associated with the valve controlling the orifice of smaller diameter being of less strength than the other spring, and the connecting means being constructed to permit of flexure of said diaphragm portions independently of each other.

3. A pressure reducing valve comprising a case, a diaphragm in the case exposed on one side to atmospheric pressure, the case being provided on the other side of the diaphragm with inlet orifices of different diameters and an outlet, levers pivotally mounted in the case, valves controlling the orifices and operably connected with the levers, springs urging the levers in a direction to close the valves, the spring associated with the valve controlling the orifice of smaller diameter being of less strength than the other spring, links pivotally connected with different portions of the diaphragm, and means loosely connecting the links with the levers.

4. A pressure reducing valve comprising a case body, a cover for the body, a diaphragm in the case body exposed on one side to atmospheric pressure, the case body provided on the other side of the diaphragm with an opening, a hollow member mounted on the case body over said opening, a closure plate having a passage therein mounted on the hollow member, means for connecting a gas supply line to said passage from the outside of said plate an orifice valve seat screwed into the plate from the inside and communicating with said passage and projecting into the hollow member, and valve means carried by the hollow member and controlling the orifice in the valve seat and operably connected through the opening with the diaphragm, said valve seat facing toward said opening in the case body whereby said plate and seat may be disassembled from said hollow member and from said valve means by the single act of removing said plate.

Signed at Los Angeles, California, this 14th day of October, 1930.

GEORGE L. HOLZAPFEL.